(12) United States Patent
Sugiyama (10) Patent No.: US 11,382,462 B2
(45) Date of Patent: Jul. 12, 2022

(54) GRINDER

(71) Applicant: HARIO Co., Ltd., Tokyo (JP)

(72) Inventor: Yuki Sugiyama, Tokyo (JP)

(73) Assignee: HARIO Co., Ltd., Tokyo (JP)

( * ) Notice: Subject to any disclaimer, the term of this patent is extended or adjusted under 35 U.S.C. 154(b) by 138 days.

(21) Appl. No.: 16/582,041

(22) Filed: Sep. 25, 2019

(65) Prior Publication Data

US 2021/0000297 A1 Jan. 7, 2021

(30) Foreign Application Priority Data

Jul. 1, 2019 (JP) .............................. JP2019-122930

(51) Int. Cl.
| | | |
|---|---|---|
| A47J 42/34 | (2006.01) | |
| A47J 42/36 | (2006.01) | |
| A47J 42/46 | (2006.01) | |
| A47J 42/24 | (2006.01) | |

(52) U.S. Cl.
CPC ............... *A47J 42/34* (2013.01); *A47J 42/36* (2013.01); *A47J 42/46* (2013.01)

(58) Field of Classification Search
CPC . A47J 42/34; A47J 42/36; A47J 42/46; B02C 18/38
See application file for complete search history.

(56) References Cited

U.S. PATENT DOCUMENTS

| | | | | |
|---|---|---|---|---|
| 5,872,413 | A | * 2/1999 | Magliari | ................ B02C 18/38 |
| | | | | 310/83 |
| 2004/0195412 | A1 | 10/2004 | Yang | |
| 2018/0178367 | A1* | 6/2018 | Benson | .................... A47J 43/06 |

FOREIGN PATENT DOCUMENTS

| | | | | |
|---|---|---|---|---|
| EP | 1466548 A1 | 10/2004 | | |
| GB | 658717 A | * 10/1951 | ............. | A47J 43/06 |
| GB | 658717 A | 10/1951 | | |
| JP | H06-071080 U | 10/1994 | | |
| JP | 2009082676 A | 4/2009 | | |
| JP | 3184678 U | 7/2013 | | |
| JP | 2015039555 A | 3/2015 | | |
| KR | 10-2015-0040487 A | 4/2015 | | |
| KR | 20150040487 A | * 4/2015 | | |
| KR | 10-1692236 B1 | 1/2017 | | |
| TW | M559692 U | 5/2018 | | |
| WO | 2018021604 A1 | 2/2018 | | |

OTHER PUBLICATIONS

English tranlate (KR20150040487A), retrieved date Apr. 16, 2021.*
Collins dictionary, meaning of the grinder, retrieved date Nov. 9, 2021. https://www.collinsdictionary.com/dictionary/english/grinder.*
Korean Office Action (Notice of Decision of Rejection) dated Feb. 23, 2021, issued in Korean Application No. 10-2019-0124721.

(Continued)

*Primary Examiner* — Jessica Cahill
*Assistant Examiner* — Mohammed S. Alawadi
(74) *Attorney, Agent, or Firm* — Potomac Law Group, PLLC; George Dolina (57) ABSTRACT

A grinder includes a connecting part configured to be attached to a rotating shaft to which a handle of a hand mill configured to grind food by hand is mounted; and a motor configured to rotate the connecting part and abut on the connecting part.

13 Claims, 9 Drawing Sheets

(56) References Cited

OTHER PUBLICATIONS

Japanese Office Action (Notice of Reasons for Refusal) dated Sep. 29, 2020, issued in Japanese Application No. 2019-122930.
Korean Office Action (Notification of Opinion Submission) dated Aug. 24, 2020, issued in Korean Application No. 10-2019-0124721.
Office Action issued in TW App No. 108136481, dated Jun. 5, 2020.
Extended European Search Report dated Nov. 14, 2019, issued in EP Application No. 19199578.6.

* cited by examiner

GRINDER

CROSS-REFERENCE TO RELATED APPLICATIONS

The present application claims priority from Japanese Patent Application No. 2019-122930 filed on Jul. 1, 2019, and the entire contents of which are hereby incorporated by reference.

BACKGROUND

1. Technical Field

The present disclosure relates to a grinder used with a hand mill configured to grind food such as coffee beans, tea leaves, and spice.

2. Related Art

A hand mill capable of grind food such as coffee beans, tea leaves, and spice (hereinafter collectively referred to as "food") by hand has been known, which is disclosed in, for example, Japanese Utility Model Registration (JU-R) No. 3184678. This hand mill includes a handle operated to grind food.

However, this hand mill needs to operate the handle by hand, and therefore has a problem that the user operating the hand mill would get tired.

To solve this problem, it has been proposed that a disk with a ladder chain which is fixed to the side surface of the disk be attached to the hand mill, which is disclosed in, for example, Japanese Unexamined Patent Application Publication (JP-A) No. 2009-082676. Then, the ladder chain is meshed with a sprocket with the power transmitted to the ladder chain fixed to the side surface of the disk, so that the hand mill can be rotated by the dynamics. Therefore, it is possible to prevent the user from getting tired.

However, in order to apply the disk disclosed in JP-A No. 2009-082676 to the hand mill disclosed in JU-R No. 3184678, it is required to first remove a clamp fitting of the hand mill, and then remove the handle. Next, it is required to attach the disk to the hand mill, and fix the disk by the clamp fitting. After that, the sprocket with the power needs to be meshed with the ladder chain, and set in the hand mill.

In this way, there is a problem with the complexity of setting of the hand mill to allow the hand mill to grind food by electric power. Therefore, there is a demand to provide a grinder which can be easily set with the hand mill to grind food by electric power.

SUMMARY

It is desirable to provide a grinder which can be easily set with a hand mill to grind food by electric power.

An aspect of the present disclosure provides a grinder includes: a connecting part configured to be attached to a rotating shaft to which a handle of a hand mill configured to grind food by hand is mounted; and a motor configured to rotate the connecting part and abut on the connecting part.

The grinder further includes an actuator button configured to detect an operation. When detection of the operation starts, the motor rotates the connecting part, and when the detection of the operation stops, the motor stops rotating the connecting part.

The grinder further includes an attachment securely attached to the grinder and the hand mill. The attachment includes at least one of: a first attachment securely attached to the grinder and the hand mill when the hand mill has a first shape; and a second attachment securely attached to the grinder and the hand mill when the hand mill has a second shape.

The grinder further includes a change attachment configured to be attached to the rotating shaft and the connecting part. The change attachment includes at least one of: a size change attachment used when the rotating shaft and the connecting part are different in size from one another; and a shape change attachment used when the rotating shaft and the connecting part are different in shape from one another.

The present disclosure provides a grinder which can be easily set with a hand mill to grind food by electric power.

DETAILED DESCRIPTION

<Grinder 1>

Figure 1A:
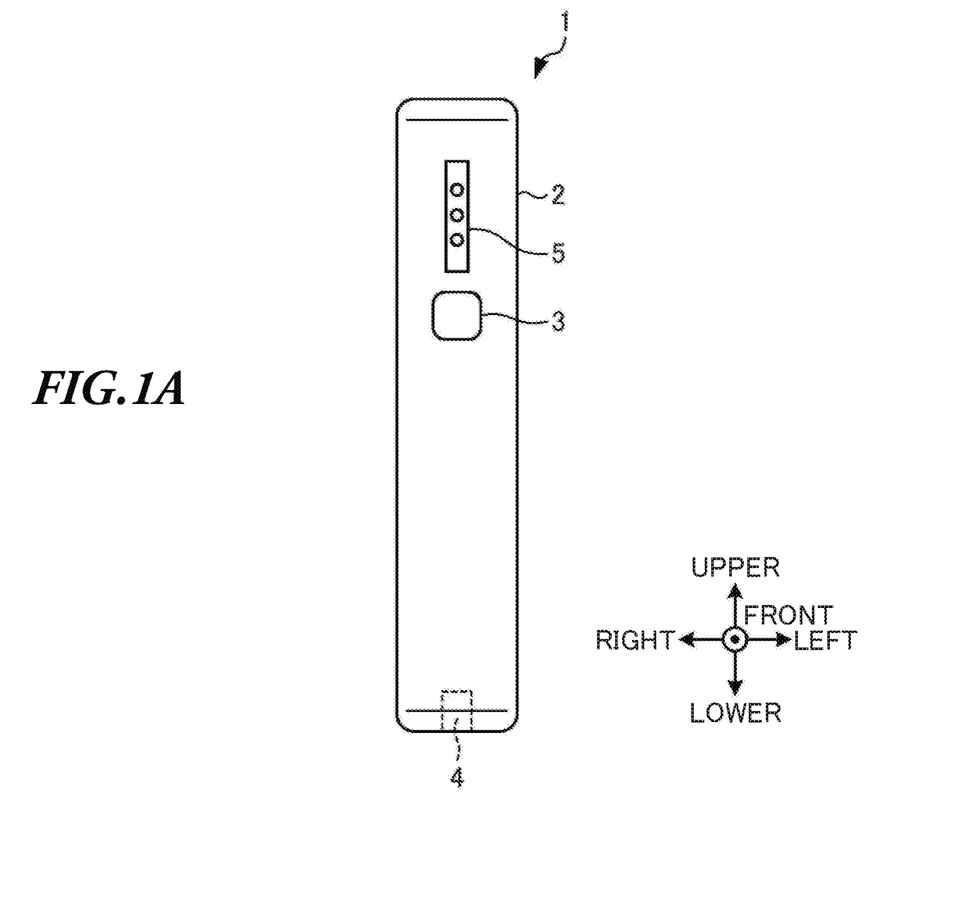
FIGS. 1A-B are external views illustrating a grinder.
Figure 1B:
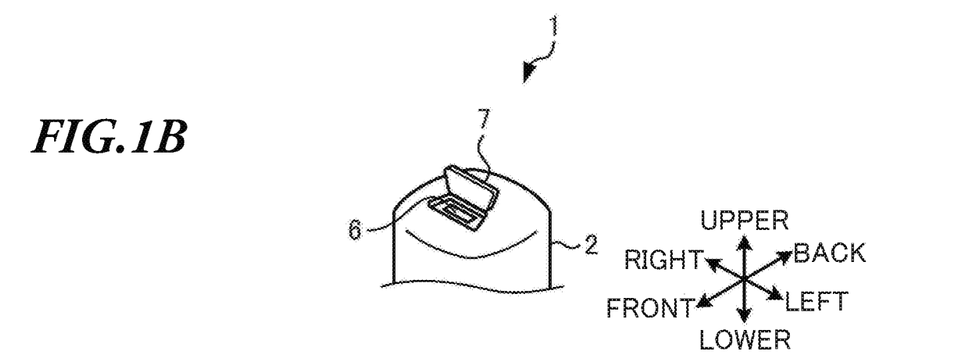

The external appearance of a grinder 1 will be described with reference to FIGS. 1A-B. FIG. 1A is a front view illustrating the grinder 1. FIG. 1B is a perspective view illustrating the top face of the grinder 1.

As illustrated in FIGS. 1A-B, the grinder 1 includes a main body 2, an actuator button 3, a connecting part 4, a display 5, a slot 6, and a flap 7.

<Main Body 2>

The main body 2 mainly constitutes the body of the grinder 1. Various components are housed in the main body 2, which will be described in detail later.

<Actuator Button 3>

The actuator button 3 is provided in the main body 2. The actuator button 3 is configured to receive an operation to rotate the connecting part 4. Here, with the present embodiment, "operating the actuator button 3" means pushing the actuator button 3.

<Connecting Part>

The connecting part 4 is formed in the bottom face of the main body 2 and includes a concave portion which is hollowed from the bottom face. Here, a rotating shaft 27 described later is inserted and fitted in the concave portion of the connecting part 4.

<Display 5>

The display 5 is provided above the actuator button 3. The display 5 is configured to display the remaining amount of a battery 20 described later. With the present embodiment, the display 5 includes tree LEDs which can be turned on and off, and indicates the remaining amount of the battery 20 based on the number of LEDs being turned on.

To be more specific, when the remaining amount of the battery 20 is lower than one-third, one LED is turned on. In addition, when the remaining amount of the battery 20 is equal to or higher than one-third and lower than two-thirds, two LEDs are turned on. Moreover, when the remaining amount of the battery 20 is equal to or higher than two-thirds, three LEDs are turned on.

<Slot 6>

The slot 6 is formed in the top face of the main body 2. A charge cable (not shown) configured to charge the grinder 1 can be inserted into the slot 6. With the present embodiment, the grinder 1 can be used while the charge cable is inserted into the slot 6. By this means, even though the remaining amount of the battery 20 is low, it is possible to use the grinder 1.

<Flap 7>

The flap 7 is provided above the slot 6, and configured to close the slot 6 when the charge cable is not inserted into the slot 6.

<Attachment Used to Securely Attach Grinder 1>

Figures 2A, 2B:
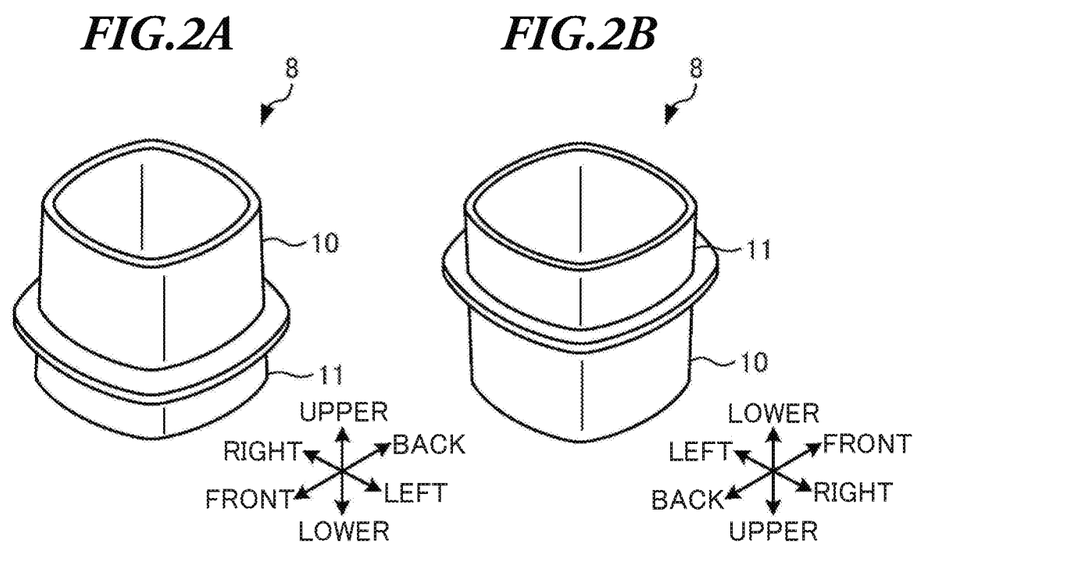
FIGS. 2A-D are external views illustrating attachments.
Figure 2C:
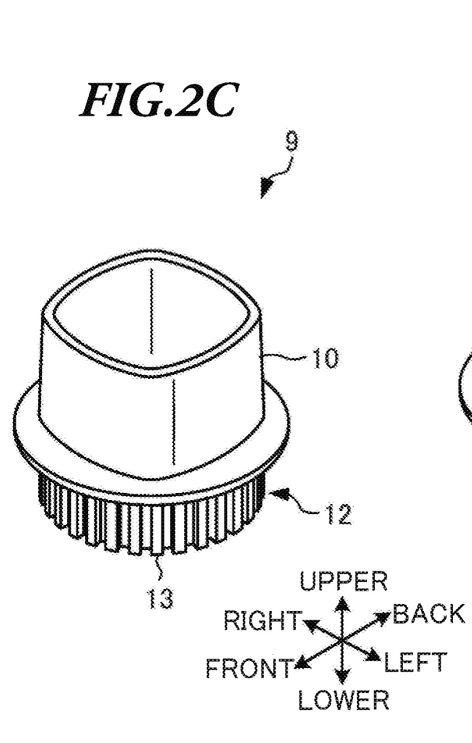
Figure 2D:
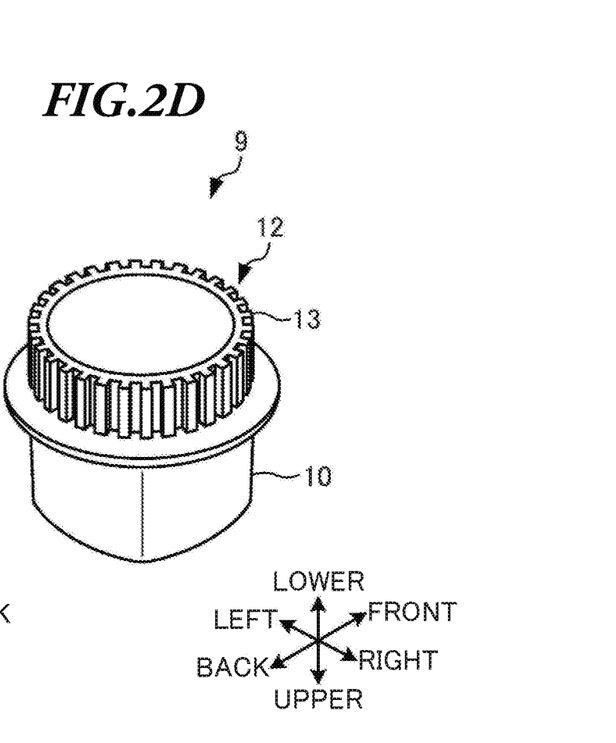

Next, attachments configured to securely attach the grinder 1 will be described with reference to FIGS. 2A-D. FIGS. 2A-B are perspective views illustrating a square attachment 8. FIGS. 2C-D are perspective views illustrating a round attachment 9.

As examples of "attachment", a square attachment 8 securely attached to a squire mill 22 described later and a round attachment 9 securely attached to a round mill 24 will be described.

<Square Attachment 8>

As illustrated in FIGS. 2A-B, the square attachment 8 is configured to securely attach the grinder 1 to the square mill 22, and has a hollow interior. The square attachment 8 includes a grinder fixing part 10 to securely attach the grinder 1 and a square mill fixing part 11 securely attached to the square mill 22.

<Round Attachment 9>

As illustrated in FIGS. 2C-D, the round attachment 9 is configured to securely attach the grinder 1 to the round mill 24, and has a hollow interior. The round attachment 9 includes the grinder fixing part 10 to securely attach the grinder 1 and a round mill fixing part 12 securely attached to the round mill 24.

Here, in a case where the grinder 1 and the round mill 24 are securely attached to the round attachment 9, when the connecting part 4 of the grinder 1 is rotated, the grinder 1 and the round mill 24 are rotated, and therefore the round mill 24 may fall down.

Therefore, with the present embodiment, the round mill fixing part 12 includes a plurality of ribs to prevent the round mill 24 from falling down when the connecting part 4 of the grinder 1 is rotated. Here, the ribs 13 are provided on the outer periphery of the round mill fixing part 12 and protrude outward.

<Block Diagram of Grinder 1>

Figure 3:
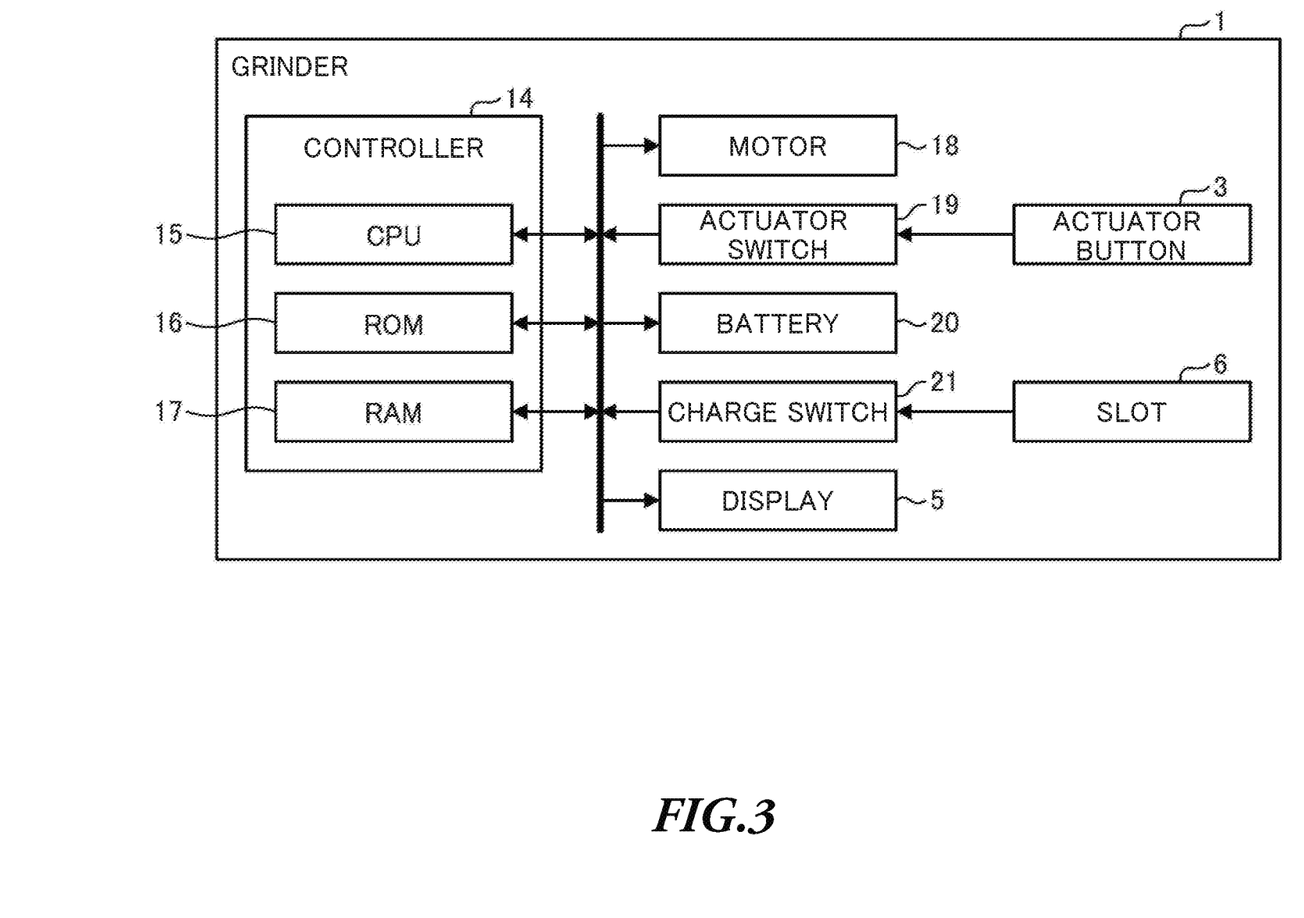
FIG. 3 is a block diagram illustrating the grinder.

Next, the block diagram of the grinder 1 will be described with reference to FIG. 3.

The grinder 1 includes a controller 14, a motor 18, an actuator switch 19, a battery 20, and a charge switch 21.

<Controller 14>

The controller 14 is configured to control the grinder 1. The controller 14 includes a CPU 15, a ROM 16, and a RAM 17.

<CPU 15>

The CPU 15 reads programs stored in the ROM 16, and performs predetermined arithmetic processing to send predetermined signals to the display 5 and the motor 18. The CPU 15 receives predetermined signals from the actuator switch 19 and the charge switch 21 to perform processing based on the received signals.

<ROM 16>

The ROM 16 is provided to store control programs performed by the CPU 15 and data and so forth to send signals to the display 5 and the motor 18.

<RAM 17>

The RAM 17 is provided to store various data determined by performing the programs by the CPU 15.

<Motor 18>

The motor 18 is provided in the main body 2 to rotate the connecting part 4. To be more specific, upon receiving a signal from the controller 14, the motor 18 rotates the connecting part 4.

<Actuator Switch 19>

The actuator switch 19 is provided to detect the actuator button 3 being operated. Upon detecting the actuator button 3 being operated, the actuator switch 19 outputs an actuator switch detection signal to the controller 14.

<Buttery 20>

The buttery 20 is charged by inserting the charge cable into the slot 6. The buttery 20 functions as a power supply for the grinder 1. With the present embodiment, the buttery 20 can be repeatedly charged and discharged.

<Charge switch 21>

The charge switch 21 is provided to detect the charge cable being inserted into the slot 6. Upon detecting the charge cable being inserted into the slot 6, the charge switch 21 sends a charge switch detection signal to the controller 14.

<Main Process Performed in Grinder 1>

Figure 4:
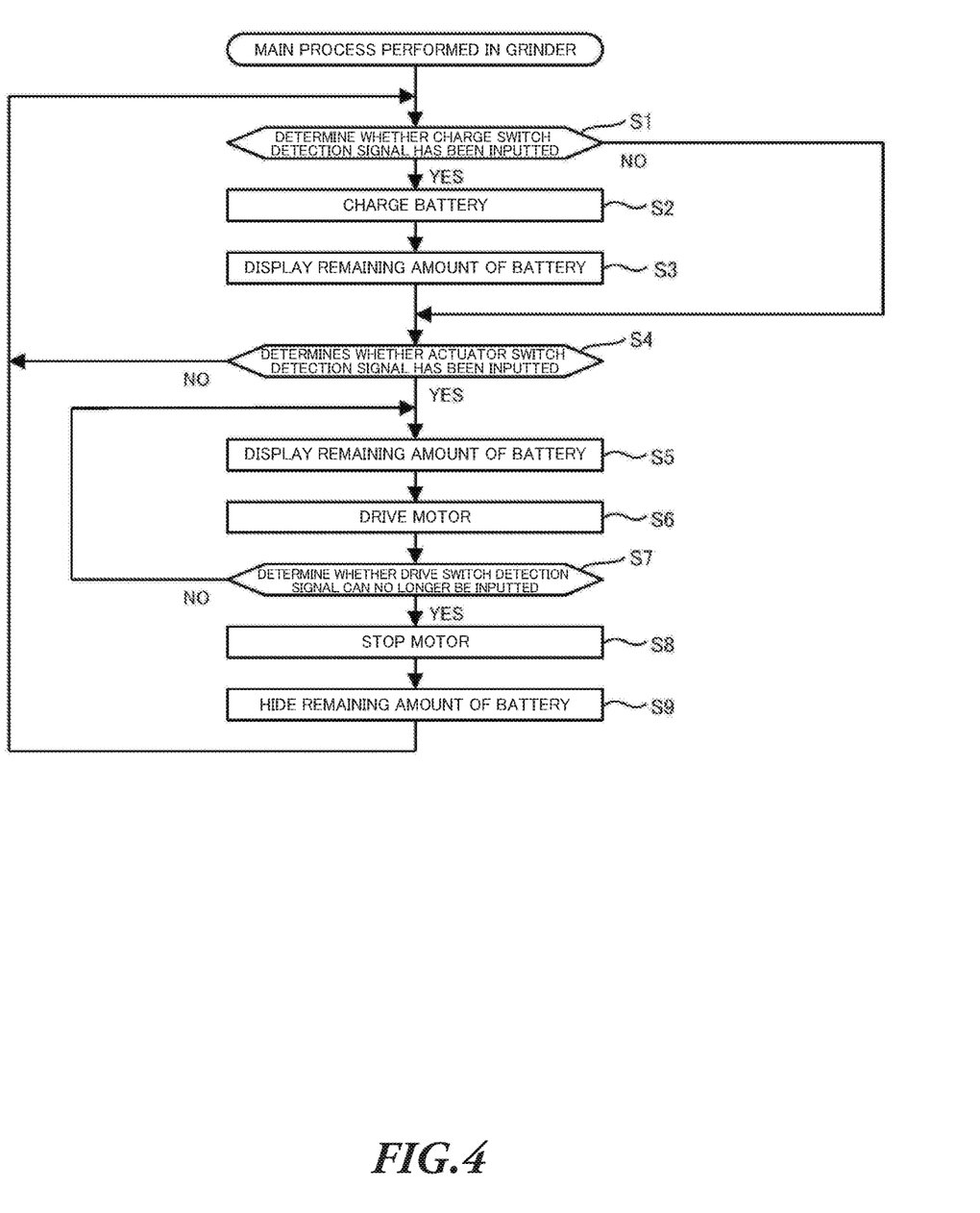
FIG. 4 is a flowchart illustrating a main process performed in the grinder.

Next, the main process performed in the grinder 1 will be described with reference to FIG. 4.

<Step S1>

In step S1, the CPU 15 determines whether or not a charge switch detection signal has been inputted. To be more specific, the CPU 15 determines whether or not the charge cable is inserted into the slot 6 and a charge switch detection signal has been inputted from the charge switch 21. When determining that the charge switch detection signal has been inputted (step S1/YES), the CPU 15 moves the step to step S2. On the other hand, when determining that the charge switch detection signal has not been inputted (step S1/NO), the CPU 15 moves the step to step S4.

<Step S2>

In the step S2, CPU 15 performs charging. To be more specific, the CPU 15 charges the battery 20. Then, when the step S2 ends, the CPU 15 moves the step to step S3.

<Step S3>

In the step S3, the CPU 15 allows the display of the remaining amount of the battery 20. To be more specific, the CPU 15 causes the display 5 to display the remaining amount of the battery 20. When the step S3 ends, the CPU 15 moves the step to the step S4.

<Step S4>

In the step S4, the CPU 15 determines whether or not an actuator switch detection signal has been inputted. To be more specific, the CPU 15 determines whether or not the actuator button 3 has been operated and the actuator switch detection signal has been inputted from the actuator switch 19. When determining that the actuator switch detection signal has been inputted (step S4/YES), the CPU 15 moves the step to step S5. On the other hand, when determining that the actuator switch detection signal has not been inputted (step S4/NO), the CPU 15 moves the step to the step S1.

<Step S5>

In the step S5, the CPU 15 allows the display of the remaining amount of the battery 20. To be more specific, the CPU 15 causes the display 5 to display the remaining amount of the battery 20 in the same way as in the step S3. Then, when the step S5 ends, the CPU 15 moves the step to step S6.

<Step S6>

In the step S6, the CPU 15 causes the motor 18 to be driven. To be more specific, the CPU 15 outputs a predetermined signal to the motor 18. Here, upon receiving the predetermined signal, the motor 18 is driven to rotate the connecting part 4. When the step S6 ends, the CPU 15 moves the step to step S7.

<Step S7>

In the step S7, the CPU 15 determines whether or not the drive switch detection signal is no longer inputted. To be more specific, in the case where the drive switch detection signal has been inputted from the drive switch 19 (step S4/yes), the CPU 15 determines whether or not the operation on the drive button 3 is stopped and therefore the actuator switch detection signal is no longer inputted. When determining that the actuator switch detection signal is no longer inputted (step S7/YES), the CPU 15 moves the step to step S8. On the other hand, when determining that the actuator switch detection signal is still inputted (step S7/NO), the CPU 15 moves the step to the step S5.

<Step S8>

In the step S8, the CPU 15 causes the motor 18 to be stopped. To be more specific, the CPU 15 outputs a predetermined signal to the motor 18. Here, when the predetermined signal is inputted to the motor 18, the motor 18 is stopped to stop the rotation of the connecting part 4. When the step S8 ends, the CPU 15 moves the step to step S9.

With the present embodiment, the connecting part 4 is rotated by operating the actuator button 3, and when the operation on the actuator button 3 is stopped, the rotation of the connecting part 4 stops. By this means, it is possible to prevent the hand mill from falling down due to the rotation of the connecting part 4 even though the actuator button 3 is not operated.

<Step S9>

In the step S9, the CPU 15 causes the remaining amount of the battery to be hidden. To be more specific, the CPU 15 causes the display 5 to hide the remaining amount of the battery 20. To be further more specific, the CPU 15 causes all the three LEDs to be turned off. When the step S9 ends, the CPU 15 moves the step to the step S1.

With the present embodiment, when the actuator switch detection signal is no longer inputted (step S7/YES), the CPU 15 causes the motor 18 to be stopped (step S8) before hiding the remaining amount of the battery 20 (step S9). It is because the motor 18 is stopped (step S8) immediately after the actuator switch detection signal is no longer inputted (step S7/YES) in order to prevent the hand mill from falling down.

<First Attachment Method of Grinder 1>

Figure 5A:
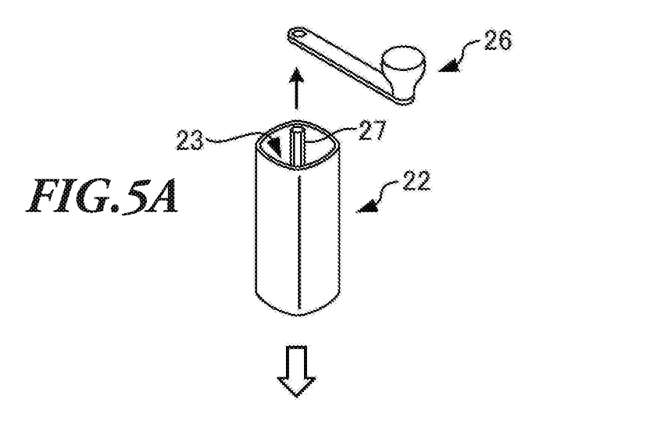
FIGS. 5A-B illustrate a first attachment method of the grinder.
Figure 5B:
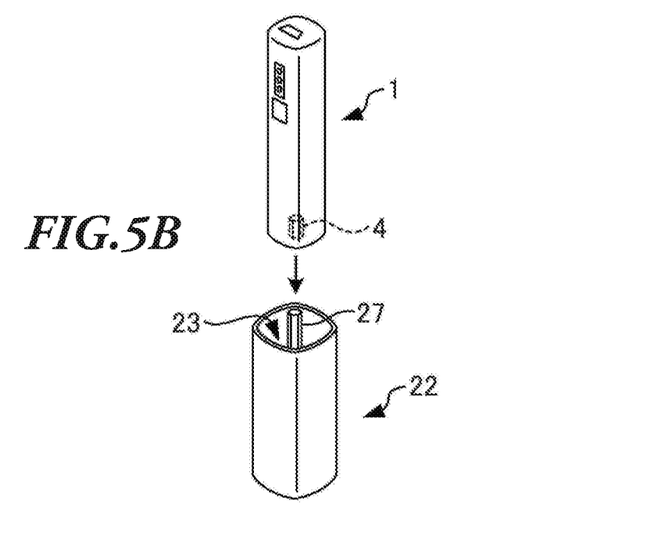

Next, a first attachment method of the grinder 1 will be described with reference to FIGS. 5A-B. FIGS. 5A-B illustrate a method of attaching the grinder 1 to the square mill 22.

Here, the square mill 22 can grind food such as coffee beans, tea leaves, and spice (hereinafter collectively referred to as "food") by hand, and has an approximately rectangular top face. The square mill 22 includes a square fitting part 23 in which the square attachment 8 is fitted, a handle 26 operated by the user of the square mill 22, and a rotating shaft 27 to which the handle 26 is mounted.

First, the handle 26 mounted to the rotating shaft 27 of the square mill 22 is removed as illustrated in FIG. 5A. Here, when the handle 6 is fastened by a clamp fitting (not shown), the handle 26 is removed after the clamp fitting is removed.

Next, the grinder 1 is attached to the square mill 22 as illustrated in FIG. 5B. To be more specific, the rotating shaft 27 of the square mill 22 is inserted in the concave portion of the connecting part 4 of the grinder 1 to attach the grinder 1 to the square mill 22.

Then, when the actuator button 3 is operated while the grinder 1 is attached to the square mill 22, the motor 18 is driven to rotate the connecting part 4. By this means, the rotating shaft 27 inserted in the concave portion of the connecting part 4 is rotated, and therefore it is possible to grind the food set in the square mill 22.

In addition, in the first attachment method of the grinder 1, the setting of the grinder 1 is completed by a simple procedure, that is, by removing the handle 26 of the square mill 22 and inserting the rotating shaft 27 of the square mill 22 in the concave portion of the connecting part 4 of the grinder 1. Therefore, it is possible to easily set the grinder 1 when the food is ground by electric power by using the hand mill 22.

<Second Attachment Method of Grinder 1>

Figure 6A:
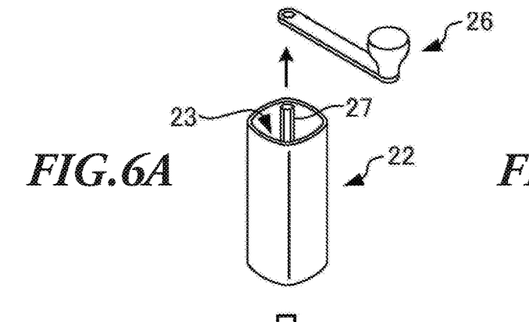
FIG. 6A-F illustrate a second attachment method of the grinder.
Figure 6B:
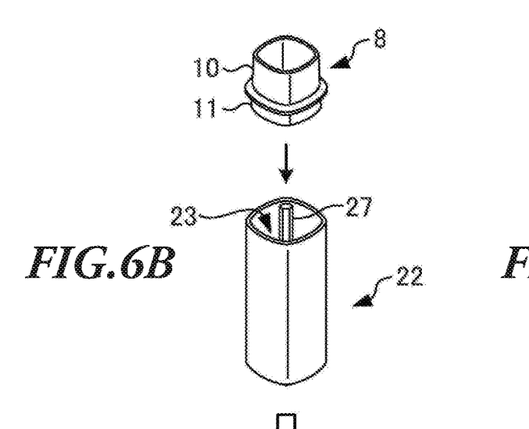
Figure 6C:
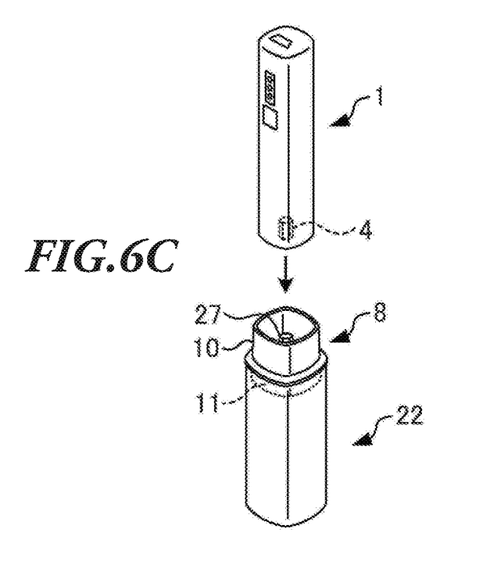
Figure 6D:
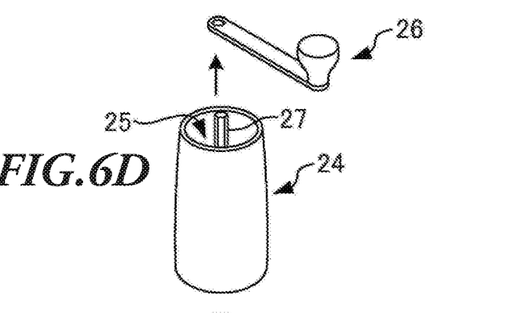
Figure 6E:
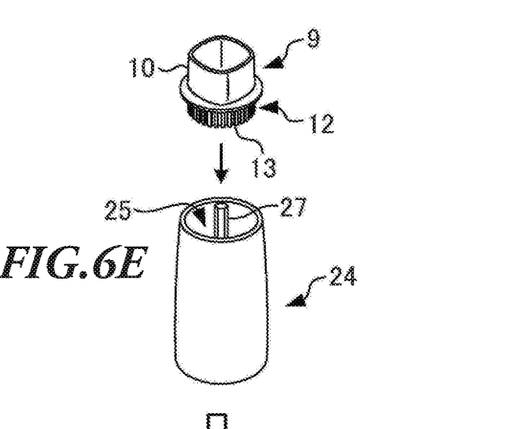
Figure 6F:
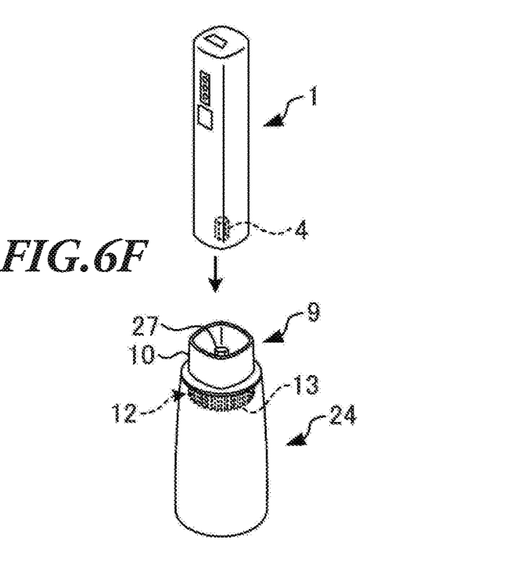

Next, a second attachment method of the grinder 1 will be described with reference to FIGS. 6A-F. FIGS. 6A-C illustrate a method of attaching the grinder 1 to the square mill 22. FIGS. 6D-F illustrate a method of attaching the grinder 1 to the round mill 24.

<Method of Attaching Grinder 1 to Round Mill>

A method of attaching the grinder 1 to the square mill 22 will be described with reference to FIGS. 6A-C.

First, the handle 26 mounted to the rotating shaft 27 of the square mill 22 is removed as illustrated in FIG. 6A.

Next, the square attachment 8 is engaged with the square mill 22, and securely attached to the square mill 22 as illustrated in FIG. 6B. To be more specific, the square mill fixing part 11 of the square attachment 8 is fitted in the square fitting part 23 of the square mill 22 from above to securely attach the square attachment 8 to the square mill 22.

Next, the grinder 1 is securely attached to the square attachment 8 as illustrated in FIG. 5C. To be more specific, the grinder 1 is fitted in the grinder fixing part 10 from above to securely attach the grinder 1 to the square attachment 8. At this time, the rotating shaft 27 of the square mill 22 is inserted and can be fitted in the concave portion of the connecting part 4 of the grinder 1.

Then, when the actuator button 3 is operated while the grinder 1 and the square mill 22 are securely attached to the square attachment 8, the motor 18 is driven to rotate the connecting part 4. By this means, the rotating shaft 27 inserted in the connecting part 4 is rotated, and therefore it is possible to improve the safety when the food set in the square mill 22 is ground.

<Method of Attaching Grinder 1 to Round Mill 24>

Next, a method of attaching the grinder 1 to the round mill 24 will be described with reference to FIGS. 6D-F.

The square mill 24 can grind food by hand, and has an approximately circular top face. The round mill 24 includes a round fitting part 25 in which the round attachment 9 is fitted, the handle 26 operated by the user of the round mill 24, and the rotating shaft 27 to which the handle 26 is mounted.

First, the handle 26 mounted to the rotating shaft 27 of the round mill 24 is removed as illustrated in FIG. 6D.

Next, the round attachment 9 is securely attached to the round mill 24 as illustrated in FIG. 6E. To be more specific, the round mill fixing part 12 of the round mill 24 is fitted in the round fitting part 25 of the round mill 24 from above to securely attach the round attachment 9 to the round mill 24.

Next, the grinder 1 is securely attached to the round attachment 9 as illustrated in FIG. 6F. To be more specific, the grinder 1 is fitted in the grinder fixing part 10 from above to securely attach the grinder 1 to the round attachment 9. At this time, the rotating shaft 27 of the round mill 24 is inserted and can be fitted in the concave portion of the connecting part 4 of the grinder 1.

Then, when the actuator button 3 is operated while the grinder 1 and the round mill 24 are securely attached to the round attachment 9, the motor 18 is driven to rotate the connecting part 4. By this means, the rotating shaft 27 inserted in the connecting part 4 is rotated, and therefore it is possible to grind the food set in the round mill 24.

In this way, there are various shapes of hand mills, as illustrated by the square mill 22 and the round mill 24. By using the square attachment 8 and the round attachment 9, it is possible to securely attach the grinder 1 to various shapes of hand mills, and therefore to improve the versatility of the attachment.

<Third Attachment Method of Grinder 1>

Figure 7A:
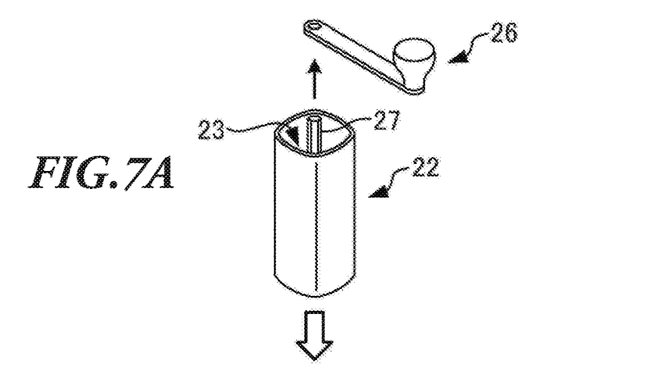
FIGS. 7A-C illustrate a third attachment method of the grinder.
Figure 7B:
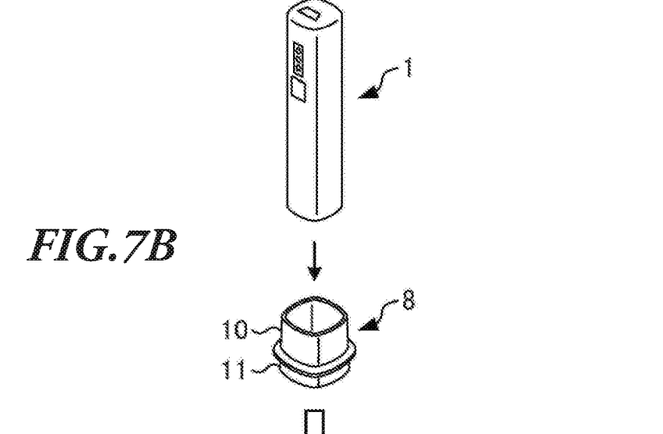
Figure 7C:
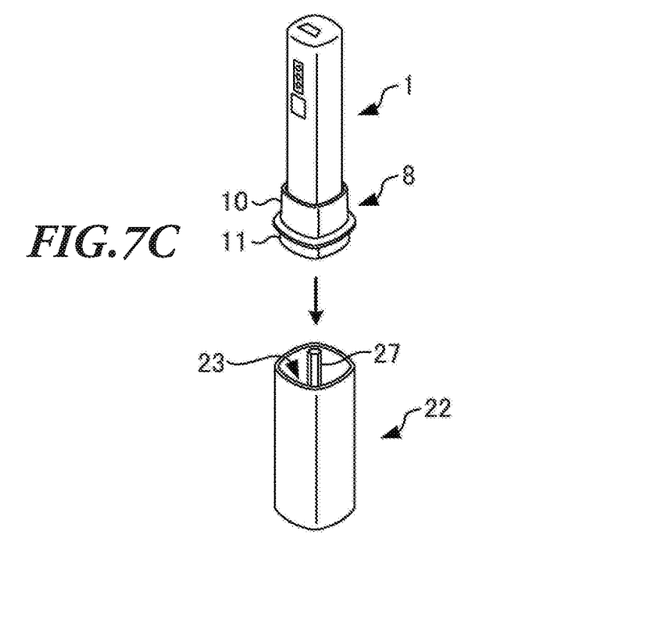

Next, a third attachment method of the grinder 1 will be described with reference to FIGS. 7A-C. FIGS. 7A-C illustrate a method of attaching the grinder 1 to the square mill 22.

First, the handle 26 mounted to the rotating shaft 27 of the square mill 22 is removed as illustrated in FIG. 7A.

Next, the grinder 1 is securely attached to the square attachment 8 as illustrated in FIG. 7B. To be more specific, the grinder 1 is fitted in the grinder fixing part 10 of the square attachment 8 from above to securely attach the grinder 1 to the square attachment 8.

Next, the square attachment 8 with the grinder 1 is securely attached to the square mill 22 as illustrated in FIG. 7C. To be more specific, the square mill fixing part 11 of the square mill attachment 8 with the grinder 1 is fitted in the square fitting part 23 of the square mill 22 from above to securely attach the square attachment 8 to the square mill 22. At this time, the rotating shaft 27 of the square mill 22 is inserted in the connecting part 4 of the grinder 1.

Here, although FIGS. 7A-C illustrate the method of attaching the grinder 1 to the square mill 22, the same applies to the method of attaching the grinder 1 to the square mill 24.

<Change Attachment>

Next, a change attachment will be described with reference to FIGS. 8A-D. FIGS. A-B are perspective views illustrating a size change attachment 28. FIGS. 8C-D are perspective views illustrating a shape change attachment 29.

Hereinafter, as an example of "change attachment", the size change attachment 28 used in the case where the concave portion of the connecting part 4 and the rotating shaft 27 are different in size from one another will be described, and as another example of "change attachment", the shape change attachment 29 used in the case where the concave portion of the connecting part 4 and the rotating shaft 27 are different in shape from one another will be described.

<Size Change Attachment 28>

Figure 8A:
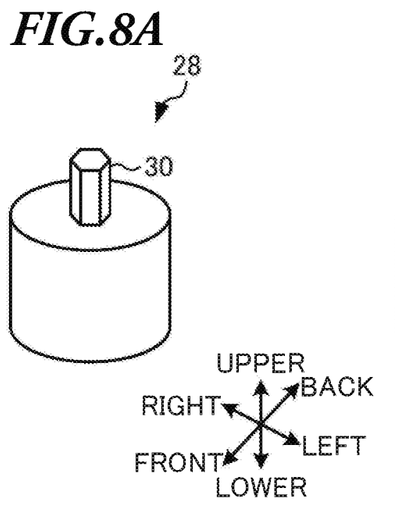
FIGS. 8A-D are external views illustrating change attachments.
Figure 8B:
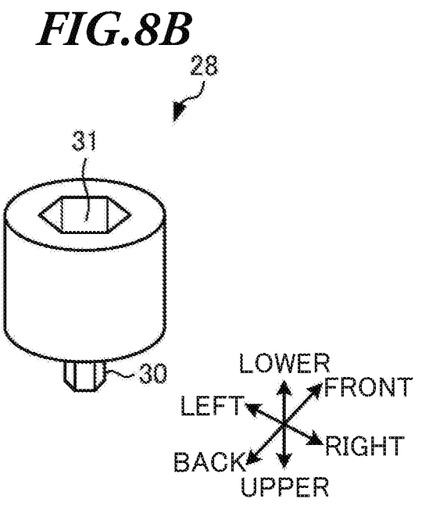
Figure 8C:
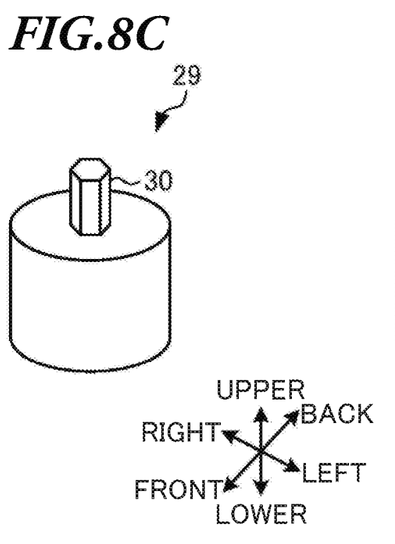
Figure 8D:
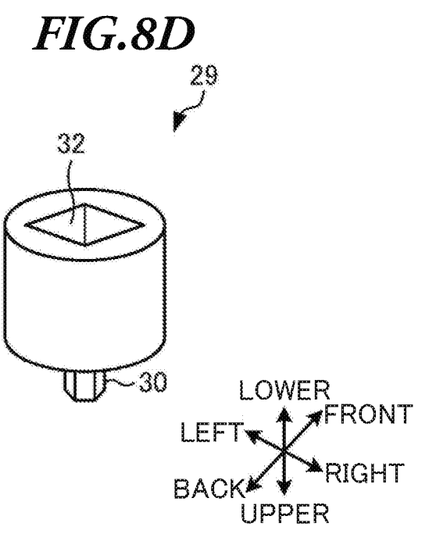

As illustrated in FIGS. 8A-B, the size change attachment 28 is used in the case where the concave portion of the connecting part 4 and the rotating shaft 27 are different in size (for example, depth, and width) from one another. The size change attachment 28 includes an insert shaft 30 configured to be inserted in the concave portion of the connecting part 4, and a size change hole 31 in which the rotating shaft 27 which is different in size from the concave portion of the connecting part 4 is inserted.

Here, the insert shaft 30 and the concave portion of the connecting part 4 are approximately the same in size as one another. Therefore, the insert shaft 30 is inserted and can be fitted in the concave portion of the connecting part 4.

Meanwhile, the size change hole 31 is approximately the same in size as the rotating shaft 27 which is different in size from the concave portion of the connecting part 4. Therefore, the rotating shaft 27 which is different in size from the concave portion of the connecting part 4 is inserted and can be fitted in the size change hole 31.

Here, when the concave portion of the connecting part 4 is approximately the same in size as the rotating shaft 27, the rotating shaft 27 is inserted and can be fitted in the concave portion of the connecting part 4. By this means, it is possible to rotate the rotating shaft 27 by operating the actuator button 3.

On the other hand, when the concave portion of the connecting part 4 and the rotating shaft 27 are different in size from one another, it is not possible to use the grinder 1.

For example, when the width of the concave portion of the connecting part 4 is 3 mm, and the width of the rotating shaft 27 is greater than 3 mm, for example, 4 mm, the rotating shaft 27 cannot be inserted in the concave portion of the connecting part 4, and therefore it is not possible to use the grinder 1.

On the other hand, when the width of the rotating shaft 27 is smaller than 3 mm, for example, 2 mm, the rotating shaft 27 can be inserted but cannot be fitted in the concave portion of the connecting part 4. Therefore, even when the actuator button 3 is operated, the rotating shaft 27 is not rotated, and consequently it is not possible to use the grinder 1.

To solve these problems, the size change attachment 28 is attached, and therefore it is possible to use the grinder 1 even when the rotating shaft 27 and the concave portion of the connecting part 4 are different in size from one another. Consequently, it is possible to improve the versatility of the grinder 1.

<Shape Change Attachment 29>

As illustrated in FIGS. 8C-D, the shape change attachment 29 is used in the case where the concave portion of the connecting part 4 and the rotating shaft 27 are different in shape from one another. The shape change attachment 29 includes the insert shaft 30 configured to be inserted in the concave portion of the connecting part 4, and a shape change hole 32 in which the rotating shaft 27 which is different in shape from the concave portion of the connecting part 4 is inserted.

Here, the shape change hole 31 and the rotating shaft 27 are the same in size as one another. By this means, the rotating shaft 27 is inserted and can be fitted in the shape change hole 32.

Here, when the concave portion of the connecting part 4 and the rotating shaft 27 are different in shape from one another, the rotating shaft 27 cannot be inserted in the concave portion of the connecting part 4, and therefore it is not possible to use the grinder 1.

For example, when the concave portion of the connecting part 4 has a hexagonal shape, and the rotating shaft 27 has a square shape as illustrated in FIG. 8D, it is not possible to insert the rotating shaft 27 in the concave portion of the connecting part 4.

To solve this problem, the shape change attachment 29 is attached, and therefore it is possible to use the grinder 1 even when the rotating shaft 27 and the concave portion of the connecting part 4 are different in shape from one another. Consequently, it is possible to improve the versatility of the grinder 1.

<Attachment Method of Change Attachment>

Next, attachment methods of the change attachments will be described with reference to FIGS. 9A-F.

a method of attaching the size change attachment 28 will be described with reference to FIGS. 9A-C.

Figure 9A:
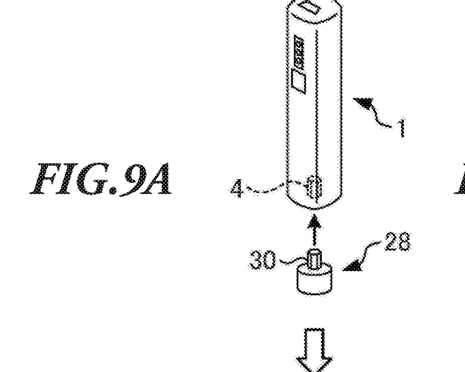
FIGS. 9A-F illustrate attachment methods of the change attachments.

First, the size change attachment 28 is attached to the grinder 1 as illustrated in FIG. 9A. To be more specific, the insert shaft 30 is inserted in the concave portion of the connecting part 4, so that the size change attachment 28 is attached to the grinder 1.

Figure 9B:
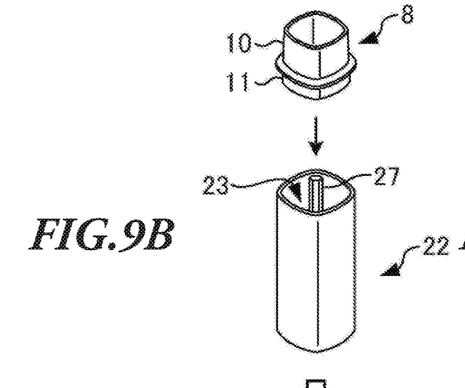

Next, the square attachment 8 is attached to the square mill 22 without the handle 26 as illustrated in FIG. 9B. To be more specific, the square mill fixing part 11 of the square attachment 8 is attached to the square fitting part 23 of the square mill 22 from above, so that the square attachment 8 is attached to the square mill 22 without the handle 26.

Figure 9C:
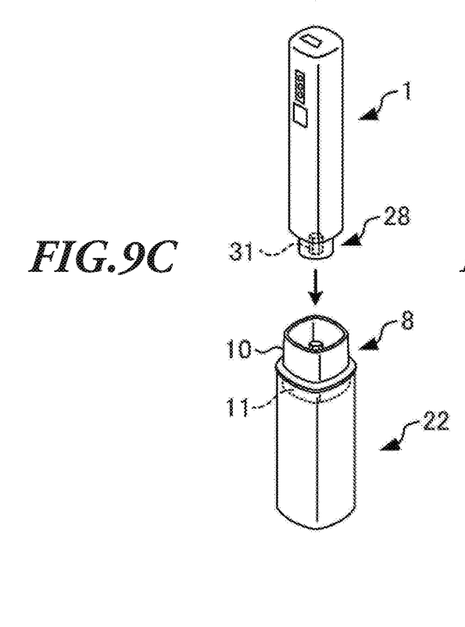

Next, the grinder 1 with the size change attachment 28 is attached to the square mill 22 with the square attachment 8 as illustrated in FIG. 9C. To be more specific, the grinder 1 with the size change attachment 28 is attached to the grinder fixing part 10 of the square attachment 8 from above. At this time, the rotating shaft 27 is inserted and can be fitted in the size change hole 31 of the size change attachment 28.

Next, a method of attaching the shape change attachment 29 will be described with reference to FIGS. 9D-F.

Figure 9D:
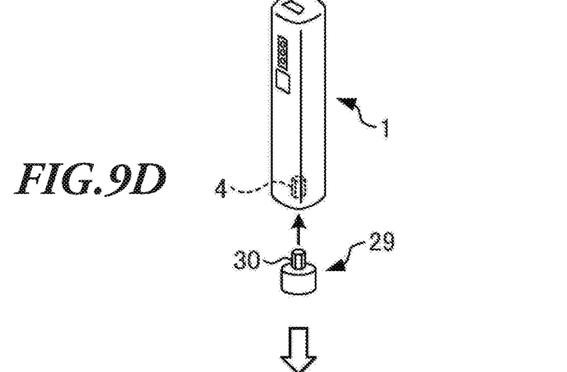

First, the shape change attachment 29 is attached to the grinder 1 as illustrated in FIG. 9D. To be more specific, the insert shaft 30 is inserted in the concave portion of the connecting part 4, so that the shape change attachment 29 is attached to the grinder 1.

Figure 9E:
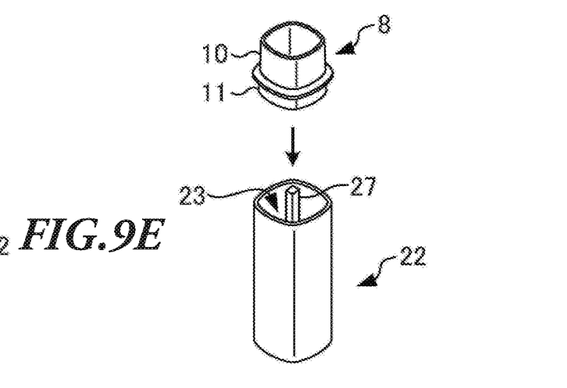

Next, the square attachment 8 is attached to the square mill 22 without the handle 26 as illustrated in FIG. 9E. To be more specific, the square mill fixing part 11 of the square attachment 8 is attached to the square fitting part 23 of the square mill 22 from above, so that the square attachment 8 is attached to the square mill 22 without the handle 26.

Figure 9F:
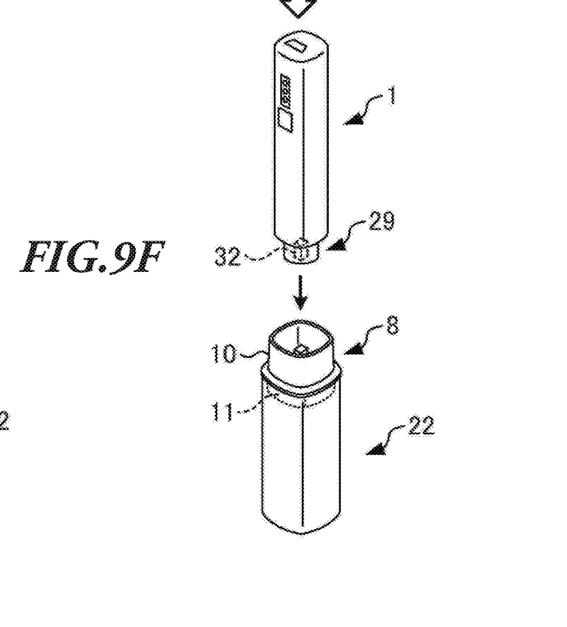

Next, the grinder 1 with the shape change attachment 29 is attached to the square mill 22 with the square attachment 8 as illustrated in FIG. 9F. To be more specific, the grinder 1 with the shape change attachment 29 is attached to the grinder fixing part 10 of the square attachment 8 from above. At this time, the rotating shaft 27 is inserted and can be fitted in the shape change hole 32 of the shape change attachment 29.

Another Embodiment

Another embodiment will be described.

With the above described embodiment, operating the actuator button 3 means pushing the actuator button, but this is by no means limiting. For example, the actuator button 3 may be configured to be slidable, and sliding the actuator button 3 may mean operating the actuator button 3. By this means, it is possible to rotate the connecting part 4 even though the actuator button 3 is not constantly operated, and therefore to make it easy to use the grinder 1.

The rotating speed of the connecting part 4 may be changed. For example, a rotating speed adjusting unit capable of adjusting the rotating speed of the connecting part 4 may be provided. To be more specific, the grinder 1 may include a rotating speed adjustment detector configured to detect the rotating speed of the connecting part 4 being adjusted, and a rotating speed adjustment control unit configured to control the adjustment of the rotating speed of the connecting part 4 when the rotating speed adjustment detector detects the rotating speed being adjusted. By this means, it is possible to adjust the rotating speed of the connecting part 4 to a desired speed for the user, and therefore to improve the convenience of the grinder 1.

In addition, the display 5 may display not only the remaining amount of the battery 20 but also a period of time for which the grinder 1 can be used. To be more specific, the grinder 1 may include a calculation unit configured to calculate the period of time for which the grinder 1 can be used, and a control unit configured to control to the display 5 to display the period of time for which the grinder 1 can be used, based on the result of the calculation by the calculation unit.

As described above, the grinder 1 includes the connecting part 4 which can be attached to the rotating shaft 27 of the square mill 22 configured to grind food by hand and the motor 18 configured to rotate the connecting part 4, which abut on one another in the main body 2. By this means, the grinder 1 can be set in the manual square mill 22 by a simple procedure, that is, by removing the handle 26 and inserting the rotating shaft 27 in the concave portion of the connecting part 4. Therefore, it is possible to provide the grinder 1 which can be easily set with the hand mill to grind food by electric power.

In addition, when the actuator button 3 of the grinder 1 is operated, the actuator switch 19 is turned on (step S4/YES), and therefore the connecting part 4 is rotated by the motor 18 (step S6). Then, when the operation on the actuator button 3 is stopped, the actuator switch 19 is turned off (step S7/YES), and the motor 18 is stopped (step S8) to stop the rotation of the connecting part 4. By this means, when food is ground by electric power by using the hand mill, it is possible to prevent the connecting part 4 from rotating even though the actuator button 3 is not operated, and therefore to prevent the hand mill from falling down.

When the hand mill is a square mill, the square attachment 8 can be attached to the grinder 1 and the square mill 22, and when the hand mill is a round mill, the round attachment 9 can be attached to the grinder 1 and the round mill 24. By this means, it is possible to attach the grinder 1 to the hand mill, and consequently it is possible to improve the safety when food is ground.

Moreover, the grinder 1 can use the size change attachment 28 for the case where the rotating shaft 27 and the connecting part 4 are different in size from one another, and the shape change attachment 29 for the case where the rotating shaft 27 and the connecting part 4 are different in shape from one another. By this means, it is possible to use the grinder 1 even when the rotating shaft 27 and the connecting part 4 are different in size and shape from one another. Therefore, it is possible to improve the versatility of the grinder 1.

Although the embodiments of the present disclosure have been described with reference to the drawings, this is by no means limiting, and various modifications and alterations may be possible without deviation of the gist of the disclosure. In addition the subject matters of the embodiments illustrated in the drawings may be combined as long as the purposes and the configurations do not contradict each other. Moreover, the features illustrated in each of the drawings may embody individual embodiments, and the features illustrated in the drawings may not be limited to one embodiment with the combination of the drawings.

The invention claimed is:

1. A driver system for a grinder, comprising:
   a driver, including
      a housing that encloses components of the driver,
      a connecting part configured to be attached to a rotating shaft to which a handle of a hand mill configured to grind food by hand is mounted, the connecting part being exposed by an opening in the housing to allow attachment to the rotating shaft,
      a motor configured to rotate the connecting part,
      a battery operatively connected to supply electrical power to the motor, and
      an actuator button positioned on the housing and configured to detect an operation of a user of the driver system and to control rotation of the motor based on a detection of the operation; and
   an attachment having a hollow tubular body extending along a central axis, with a first end and an opposed second end, the first end having a first cross sectional profile whose inner perimeter matches in size and shape an outer perimeter of the housing of the driver such that the first end securely attaches to the housing of the driver, wherein
   the second end of the attachment has a second cross sectional profile that matches a shape of the hand mill and securely holds the hand mill and the driver together when the connecting part drives rotation of the rotating shaft, and
   the attachment includes a raised rib extending radially outward from the tubular body, in a direction perpendicular to the central axis, around an outer perimeter of the attachment, between the first end and the second end.

2. The driver system according to claim 1, wherein
   when the detection of the operation starts, the motor rotates the connecting part; and
   when the detection of the operation stops, the motor stops rotating the connecting part.

3. The driver system according to claim 2, further comprising a change attachment configured to be attached to the rotating shaft and the connecting part,
   wherein the change attachment includes at least one of:
   a size change attachment used when the rotating shaft and the connecting part are different in size from one another; and
   a shape change attachment used when the rotating shaft and the connecting part are different in shape from one another.

4. The driver system according to claim 1, further comprising a change attachment configured to be attached to the rotating shaft and the connecting part,
   wherein the change attachment includes at least one of:
   a size change attachment used when the rotating shaft and the connecting part are different in size from one another; and
   a shape change attachment used when the rotating shaft and the connecting part are different in shape from one another.

5. The driver system according to claim 1, wherein
   the second end of the attachment has an internal cross sectional shape that is a circle.

6. The driver system according to claim 5, wherein
   the second end of the attachment includes a plurality of parallel ribs rising radially in a direction perpendicular to the central axis from an outer surface of the second end around an outer periphery of the second end, the plurality of parallel ribs extending in a direction parallel to the central axis, from the raised rib to a termination of the second end, and
   each of the plurality of parallel ribs having an upper surface that comes into contact with an inner portion of a housing of the hand mill.

7. The driver system according to claim 1, wherein
   the second end of the attachment has an external cross sectional shape that is a squircle.

8. A grinding device, comprising:
   a hand mill with a rotating shaft, to which a handle for grinding food by hand can be mounted;
   a driver including
      a housing that encloses components of the driver,
      a connecting part configured to be attached to the rotating shaft, the connecting part being exposed by an opening in the housing to allow attachment to the rotating shaft,
      a motor configured to rotate the connecting part,
      a battery operatively connected to supply electrical power to the motor, and
      an actuator button positioned on the housing and configured to detect an operation of a user of the grinding device and to control rotation of the motor based on a detection of the operation; and
   an attachment having a hollow tubular body extending along a central axis, with a first end and an opposed second end, the first end having a first cross sectional profile whose inner perimeter matches in size and shape an outer perimeter of the housing of the driver such that the first end securely attaches to the housing of the driver, wherein
   the second end of the attachment has a second cross sectional profile that matches a shape of the hand mill and securely holds the hand mill and the driver together when the connecting part drives rotation of the rotating shaft,
   the attachment includes a raised rib extending radially outward from the tubular body, in a direction perpendicular to the central axis, around an outer perimeter of the attachment, between the first end and the second end, and
   the connecting part of the driver is attached to said rotating shaft instead of said handle.

9. The grinding device according to claim 8, wherein
   the motor is configured to rotate the connecting part when the detection of the operation starts, and
   the motor is configured to stop rotating the connecting part when the detection of the operation stops.

10. The grinding device according to claim 8, further comprising a change attachment configured to be attached to the rotating shaft and the connecting part,
    wherein the change attachment includes at least one of:
    a size change attachment used when the rotating shaft and the connecting part are different in size from one another; and
    a shape change attachment used when the rotating shaft and the connecting part are different in shape from one another.

11. The grinding device according to claim 8, wherein
    the second end of the attachment has an internal cross sectional shape that is a circle.

12. The grinding device according to claim 11, wherein
    the second end of the attachment includes a plurality of parallel ribs rising radially in a direction perpendicular to the central axis from an outer surface of the second end around an outer periphery of the second end, the plurality of parallel ribs extending in a direction parallel to the central axis, from the raised rib to a termination of the second end, and each of the plurality of parallel ribs having an upper surface that comes into contact with an inner portion of a housing of the hand mill.

13. The grinding device according to claim 8, wherein the second end of the attachment has an external cross sectional shape that is a squircle.

\* \* \* \* \*